Nov. 29, 1938.　　　　K. STUART　　　　2,138,560
PIE PLATE HANDLING METHOD AND APPARATUS
Filed July 13, 1936　　　2 Sheets-Sheet 1
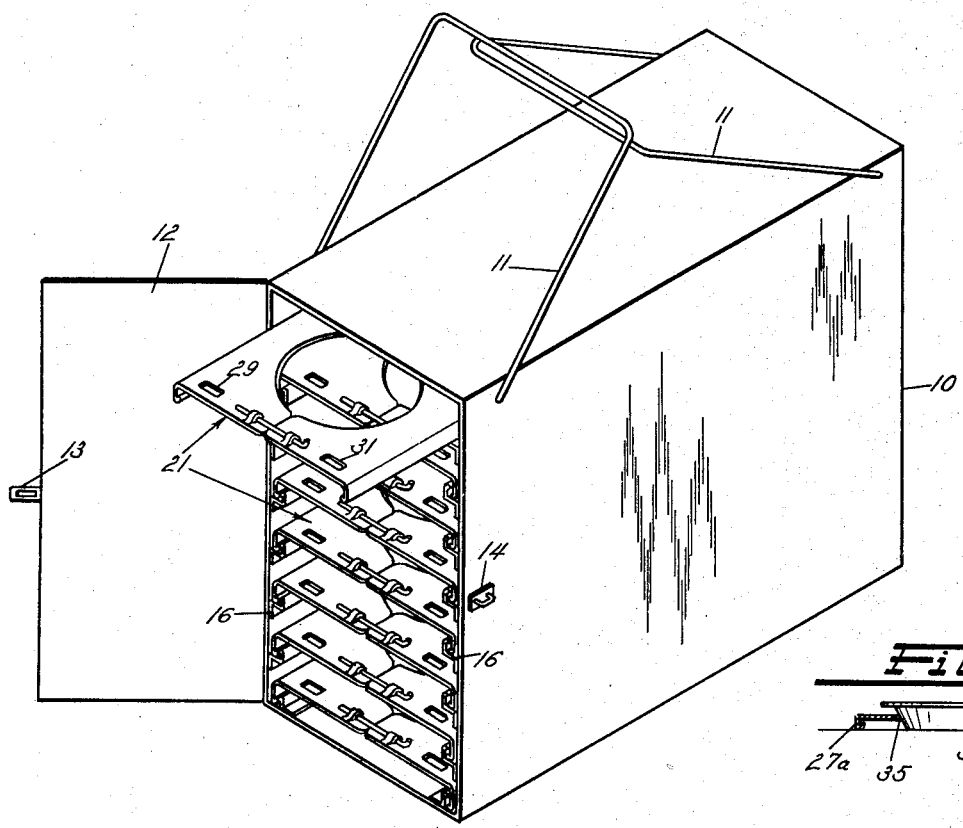
Fig. 1
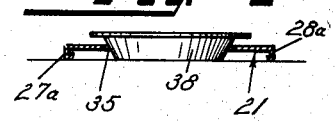
Fig. 5
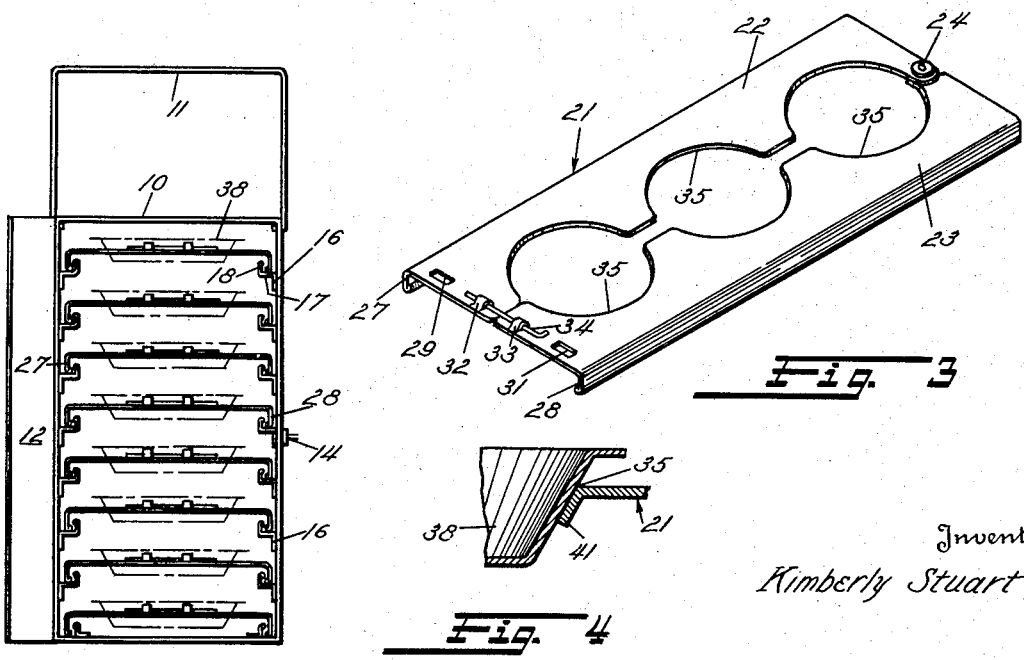
Fig. 2
Fig. 3
Fig. 4
Inventor
Kimberly Stuart
By Strauch & Hoffman
Attorneys Nov. 29, 1938.　　　　K. STUART　　　　2,138,560
PIE PLATE HANDLING METHOD AND APPARATUS
Filed July 13, 1936　　　2 Sheets-Sheet 2
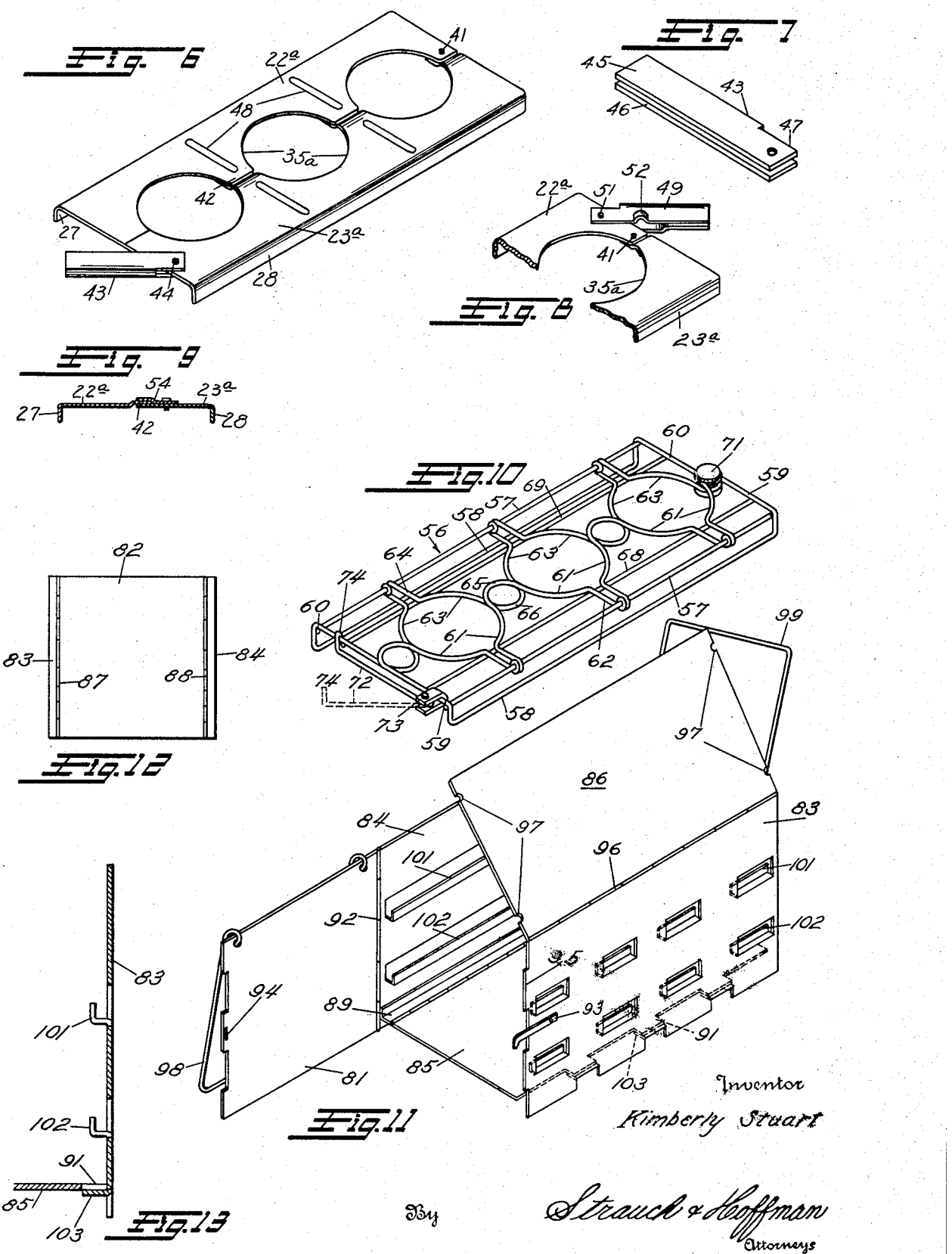
Inventor
Kimberly Stuart
By Strauch & Hoffman
Attorneys Patented Nov. 29, 1938

2,138,560

UNITED STATES PATENT OFFICE 2,138,560

PIE PLATE HANDLING METHOD AND APPARATUS

Kimberly Stuart, Neenah, Wis.

Application July 13, 1936, Serial No. 90,417

6 Claims. (Cl. 224—48)

The present invention relates to methods and apparatus for handling pie plates and the like, and in particular deals with methods and apparatus for handling pies from the time they are baked until the time they reach the consumer.

Although methods and apparatus have been in use for some time for effectively handling the usual sheet metal or heavy molded paper type of pie plate, there is now going into use a superior comparatively thin semi-flexible pie plate, but which requires special handling methods and apparatus and it is the primary object of this invention to provide novel methods and apparatus for efficiently and rapidly handling said semi-flexible pie plates or the like.

It is a further important object of the invention to provide novel apparatus which makes it possible to pick up; transport; and deposit pie plates without touching them by hand.

A further object is to provide a novel container and rack assembly for compactly and efficiently transporting any desirable number of pies and which prevents them from shifting around therein irrespective of how many pies may be in place therein.

Further objects of the invention will become apparent as the specification proceeds in connection with the annexed drawings, and from the appended claims.

In the drawings:

Figure 1 is a perspective view of the carrying case and rack assembly of the invention with the door open and with one of the racks in partially withdrawn position.

Figure 2 is a front elevational view of the case and rack assembly with the door open.

Figure 3 is a perspective view of one of the storing and transporting racks and illustrates the rack in closed position.

Figure 4 is a fragmental sectional view illustrating a modified form of the invention and shows a pie plate in place on the rack.

Figure 5 is a transverse sectional view through a modified form of storing and transporting rack also forming part of the present invention.

Figure 6 is a perspective view similar to Figure 3, but illustrates a modified form of rack forming part of my invention.

Figure 7 is a perspective view of the latch used in the rack shown in Figure 6.

Figure 8 is a view of the rack shown in Figure 6 equipped with a second latch and reenforcing member.

Figure 9 is a transverse sectional view through a further modified form of rack of my invention.

Figure 10 is a perspective view of a rack of the invention constructed of wire or rod.

Figure 11 is a perspective view of a modified form of carrying case forming part of my invention.

Figure 12 is an end view, on reduced scale, of the case of Figure 11, and

Figure 13 is a vertical sectional view of one of the side walls of the case shown in Figure 11.

With continued reference to the drawings, wherein like reference characters have been employed to designate like parts throughout the several views thereof, and with particular reference to Figures 1 and 2, I have provided a casing 10 which has handles 11 pivoted near the top edges thereof. Casing 10 is also provided with a door 12 which is hinged for movement about a vertical axis and is adapted to be held in closed position by any well known means such as a hasp 13 and a staple 14.

Welded or otherwise suitably secured to the side walls of case 10 are a plurality of guideway forming members 16 having a horizontal portion 17 and a vertical flange 18. Mounted for sliding movement in guideways 16 are a plurality of tray members or racks 21 in which the pies are adapted to be supported. Each tray comprises similar sections 22 and 23 pivoted to each other by a pin 24 or the like. The portions of the sections adjacent the pin are offset so that the upper surface of the sections lie in the same plane. The rack sections are provided with downwardly depending flanges 27 and 28 which are adapted to ride upon guideways 16. The forward edge of tray 21 is provided with a pair of holes 29 and 31 into which the operator's fingers may be inserted for withdrawing the tray. The trays are also provided with a pair of lugs 32 and 33, in which a slidable latch member 34 may be inserted for holding the parts of the rack in the closed position illustrated in Figure 3.

Each rack section is provided with a plurality of semi-circular walls 35 which support the pies in the rack. The apparatus is particularly advantageous in handling pie plates of semi-flexible material, for instance, pie plates made of laminated stock wherein one or more of the laminations is made up of a metallic foil layer. Such pie plates are naturally more pliable than the metallic plates and the heavy molded paper plates heretofore used. It is accordingly necessary to lend them more support in carrying them about, and the apparatus of this invention has been found to be entirely satisfactory for this purpose.

When such pie plates are removed from the oven, they may be placed directly in racks 21. In Figure 2 I have designated the pies as 38 and it is observed that they are supported solely by engagement of their sloping side walls with curved edges 35 of the pie rack. It is apparent that supporting the plates in this manner rigidly holds them in the rack and also lends them rigidity and prevents them from undergoing distortion even when the pies embody liquid or semi-liquid contents. If desired, however, upon removing the pies from the oven, they may be placed on a special raised surface; rack 21 opened and brought around and under the pies and locked, so that when the racks are picked up their curved edges 35 will engage the sloping sides of the pie plates.

The loaded trays or racks may then be readily introduced into guideways 16 of casing 10 and slid inwardly against the closed end thereof. When the pies reach their destination, for instance in the delivery of the pies from the bakery to the retail store, they may be removed by lifting them out of their individual racks or the racks may be opened to deposit the pies on a counter or the like. For instance, if the rack is opened when placed on a counter the pies will slide gently down on the surface and will not be damaged. In either event, however, it is a very easy matter to readily remove the pie plates without damage thereto as the racks are completely open at the bottom and a hand may be brought to bear directly against the bottom of the pie plate and the pie plate pushed upwardly away from contact with edges 35.

If desired, more or less than three openings may be provided in each rack. Moreover, the parts of the rack between the central opening and the two end openings may be extended inwardly into approximate contact when the rack is closed as seen in Figure 3 to provide a full circular support for the pies.

In Figure 4 I have illustrated a slightly modified form of rack wherein the inner edges of the openings formed in rack 21 are depressed downwardly so as to provide a curved supporting surface 41 having an inclination approximately equal to the slope of pie plate 38. This type of rack of course affords more support for the pie plate as it provides surfaces of considerable area for engagement with the sloping wall of the plate.

In Figure 5 I have illustrated a further modification of the invention wherein rack 21 is provided with comparatively shallow flanges 27a and 28a, with the result that the pies may be baked on a flat surface and racks 21 opened and placed therearound without necessitating handling the pie plates at all. As seen in Figure 5, the pie plates rest upon the baking surface as well as rack 21, with the result that the edges 35 of the rack are spaced from the sloping walls of the pie plates. When the rack is picked up, edges 35 thereof will of course engage the sloping walls of pie plate 38 and rigidly support the latter as in the previously described forms of my invention.

Although I have shown my invention as being applied to circular pie plates, it is to be understood that it is equally effective with non-circular receptacles so long as they are provided with upwardly and outwardly sloping side walls. Moreover, I have shown and by reason of its simplicity prefer to employ a simple pivot for interconnecting the two parts of the rack, but it is to be understood that if desired the rack sections may be slidably mounted for movement toward and away from each other and locked in closed position by one or more latches without departing from the spirit of the invention.

In Figures 6 and 7 I have illustrated a rack somewhat similar to that shown in Figure 3, but in this form of the invention the construction is stronger and is provided in a latch which reenforces the rack when it is locked in closed position.

The rack sections 22a and 23a are hinged together by a pin or rivet 41 similar to Figure 3, and the curved supporting surfaces 35a are extended inwardly to provide overlapping fingers 42, which lend rigidity to the rack. A latch 43 of generally U-shaped section is pivoted to section 23a by means of a pin 44. Latch 43 provides portions 45 and 46 which are adapted to frictionally engage the top and bottom surfaces of the rack respectively, to thereby lock the parts in place and to also materially reenforce the rack sections against distortion under the load of the pies or other products contained therein. Latch 43 is cut away at 47 to allow it to swing into open position.

The rack is also preferably reenforced by a plurality of embossed ridges 48 in the region of fingers 42 as seen in Figure 6, so as to stiffen the sections.

If desired, the rack may be further stiffened by providing it with a second latch 49, as seen in Figure 8 and which is pivoted on a pin 51 carried by rack section 22. Latch 49 is similar to latch 43, but is provided with an embossed portion 52, to allow it to swing into locking position without interference from pivot pin 41.

The rack may be further reenforced for heavy articles by equipping fingers 42 with plates 54 as seen in Figure 9 and which are riveted to section 23a. As seen in that figure, fingers 42 of section 22a are frictionally gripped between fingers 42 of section 23a and plates 54.

In Figure 10 I have illustrated the rack of the invention as it appears when embodied in the form of a wire structure. With continued reference to this figure the rack body 56 comprises a pair of upper longitudinal bars 57 and a pair of lower longitudinal bars 58 rigidly secured together and to a pair of end bars 59 and 60 by means of welding, soldering or the like.

Bar 59 is bent back upon itself to provide a plurality of curved supporting portions 61 and a plurality of straight portions 62 which are secured to bar 57. Bar 60 is similarly bent to provide portions 63 and 64. Bars 59 and 60 are preferably bent to provide loop portions 65 and 66 respectively which overlap so as to reenforce the structure.

Bars 59 and 60 are also bridged by a pair of further stiffening bars 68 and 69 respectively which underlie portions 62 and 64 and may be secured thereto. Bars 59 and 60 are provided with eyes and are pivoted together by means of a pivot pin assembly 71.

The other ends of bars 59 and 60 are releasably locked together by means of a latch member 72 pivoted on a bracket 73 secured to bar 59. Member 72 is provided with a hook portion 74 which is adapted to be engaged with bar 60. When member 72 is swung into the dotted line position the rack sections may be opened as described in connection with the first form of my invention.

In Figures 11, 12 and 13 I have illustrated a further form of carriers for the trays. In this form of the invention the carrier is of collapsible construction and comprises end walls 81 and 82, side walls 83 and 84, a bottom wall 85, and a top 86. End wall 82 is connected to side walls 83 and 84 by means of hinges 87 and 88, respectively, and as seen in Figure 12 the hinges are offset from the corners of the carrier.

Bottom wall 85 is pivoted to an inwardly facing flange-like member 89 secured to wall 84 and is provided in its free edge with a plurality of fingers 91 for a purpose that will presently appear. End wall 81 constitutes a door and is pivoted to side wall 84 by means of a hinge 92 and it is adapted to be locked in closed position by means of a latch 93 pivoted to side wall 83 and cooperating with a keeper slot 94 formed in door 81. Door 81 is also provided with notches into which interfit fingers 95 formed on side wall 83.

Top 86 is pivoted to side wall 83 by means of a hinge 96 and is provided with a plurality of notches 97 to allow a pair of handles 98 and 99 which are connected to end walls 81 and 82, respectively, to be brought into carrying position over the top of the structure.

Struck out of each side wall 83 and 84, as seen in Figure 13, are a plurality of fingers 101 and 102, which provide upper and lower tracks, respectively, for supporting the racks in a manner similar to the carrier of Figure 1. The lower edge of side wall 83 is also provided with a plurality of outwardly bent fingers 103 upon which fingers 91 of bottom 85 are adapted to seat. Fingers 101 and 102 are spaced longitudinally of wall 83 a sufficient distance to allow fingers 91 of the bottom to pass therebetween when the bottom is swung upwardly, and although fingers 101 and 102 of wall 84 are shown as continuous, they may, if desired, also be spaced in the manner of the fingers of wall 83.

When the carrier is folded bottom 85 is first lifted upwardly, and as it is hinged at a point offset from wall 84 it will fold flush against tracks 101 and 102. Door 81 is then opened and the sides folded toward each other. As hinges 87 and 88 are offset from the side walls the tracks do not interfere with the side walls when they are folded together. Top 86 may be folded outwardly so as to lie flat against side wall 83.

It is to be understood that, if desired, the combined latching and reenforcing member shown in Figure 7 may be used in the form of rack construction shown in Figure 10.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a rack for supporting semi-flexible pie or similar plates of the character having an outwardly and upwardly sloping side wall, a pair of cooperating rack members, means for releasably securing said rack members together in side-by-side relationship to provide a rack body having a substantially flat upper surface, each of said members having at least two arcuate edges facing the other member and cooperating to define generally circular upwardly and inwardly facing substantially continuous annular supports for engaging the sloping side wall of said plate for supporting the latter substantially continuously around its periphery, for rigidly supporting the same, each of said members having stiffening ridges provided therein between the arcuate edges thereof.

2. The rack described in claim 1, wherein each of said members is provided with a finger intermediate their arcuate edges, said fingers overlapping to reenforce said rack body.

3. The rack described in claim 1, wherein each end of said rack body is provided at each end thereof with means for restraining said rack members against flexing with respect to each other about a longitudinal axis.

4. In a rack for supporting semi-flexible pie or similar plates of the character having an outwardly and upwardly sloping side wall, a pair of cooperating rack members, means for releasably securing said rack members together in side-by-side relationship to provide a rack body having a substantially flat upper surface, each of said members having at least two arcuate edges facing the other member and cooperating to define generally circular upwardly and inwardly facing substantially continuous annular supports for engaging the sloping side wall of said plate for supporting the latter substantially continuously around its periphery, for rigidly supporting the same, and at least one device connected to one end of said rack body for frictionally engaging the upper and lower surfaces of said rack members for stiffening said body.

5. The rack described in claim 4, wherein said device comprises a bracket of generally U-shaped cross-section and is pivotally connected to one of said members.

6. The rack described in claim 4, wherein said rack members are provided with fingers which intermesh with respect to each other when said rack members are disposed in closed position.

KIMBERLY STUART.